United States Patent [19]

Galle

[11] Patent Number: 5,794,323
[45] Date of Patent: Aug. 18, 1998

[54] NON-ORIENTING MULTIPLE BORE HUB

[75] Inventor: Gary L. Galle, Houston, Tex.

[73] Assignee: ABB Vetco Gray Inc., Houston, Tex.

[21] Appl. No.: 683,831

[22] Filed: Jul. 18, 1996

[51] Int. Cl.[6] ............... B23Q 3/00; F16L 27/00
[52] U.S. Cl. ............ 29/464; 29/469; 285/123.1; 285/123.15
[58] Field of Search ............... 29/237, 282, 464, 29/469; 285/123.1, 123.15, 124.1, 124.2, 124.3, 124.5

[56] References Cited

U.S. PATENT DOCUMENTS

| | | | |
|---|---|---|---|
| 3,330,355 | 7/1967 | Yancey | 285/123.1 X |
| 3,340,932 | 9/1967 | Bloudoff | 285/124.1 X |
| 3,481,396 | 12/1969 | Williams et al. | 285/123.1 X |
| 3,485,516 | 12/1969 | Keller et al. | 285/123.1 X |
| 3,489,438 | 1/1970 | McClure | 285/123.1 |
| 3,620,554 | 11/1971 | Ward et al. | 29/464 X |
| 3,980,112 | 9/1976 | Basham | 285/123.1 X |
| 4,121,858 | 10/1978 | Schulz | 285/123.1 X |
| 4,607,691 | 8/1986 | Bridges | |
| 4,732,414 | 3/1988 | Inaba | 285/123.15 |
| 4,890,865 | 1/1990 | Hosono et al. | 285/123.15 |
| 5,088,774 | 2/1992 | Spiegelman | 285/123.15 |

*Primary Examiner*—Daniel Moon
*Attorney, Agent, or Firm*—James E. Bradley

[57] ABSTRACT

A connector for a dual subsea flowline simultaneously connects a primary pipe and an offset auxiliary pipe carried alongside of the primary pipe. The connector has mating hub members, each having a face, a primary bore and an auxiliary passage. The auxiliary passages intersect annular concentric grooves formed in the faces. Inner and outer auxiliary seals seal the grooves, and a primary seal seals the junction of the primary bores. The seals are linked together with a seal retainer which is installed with a remote operated vehicle in one of the hubs prior to make-up.

19 Claims, 4 Drawing Sheets

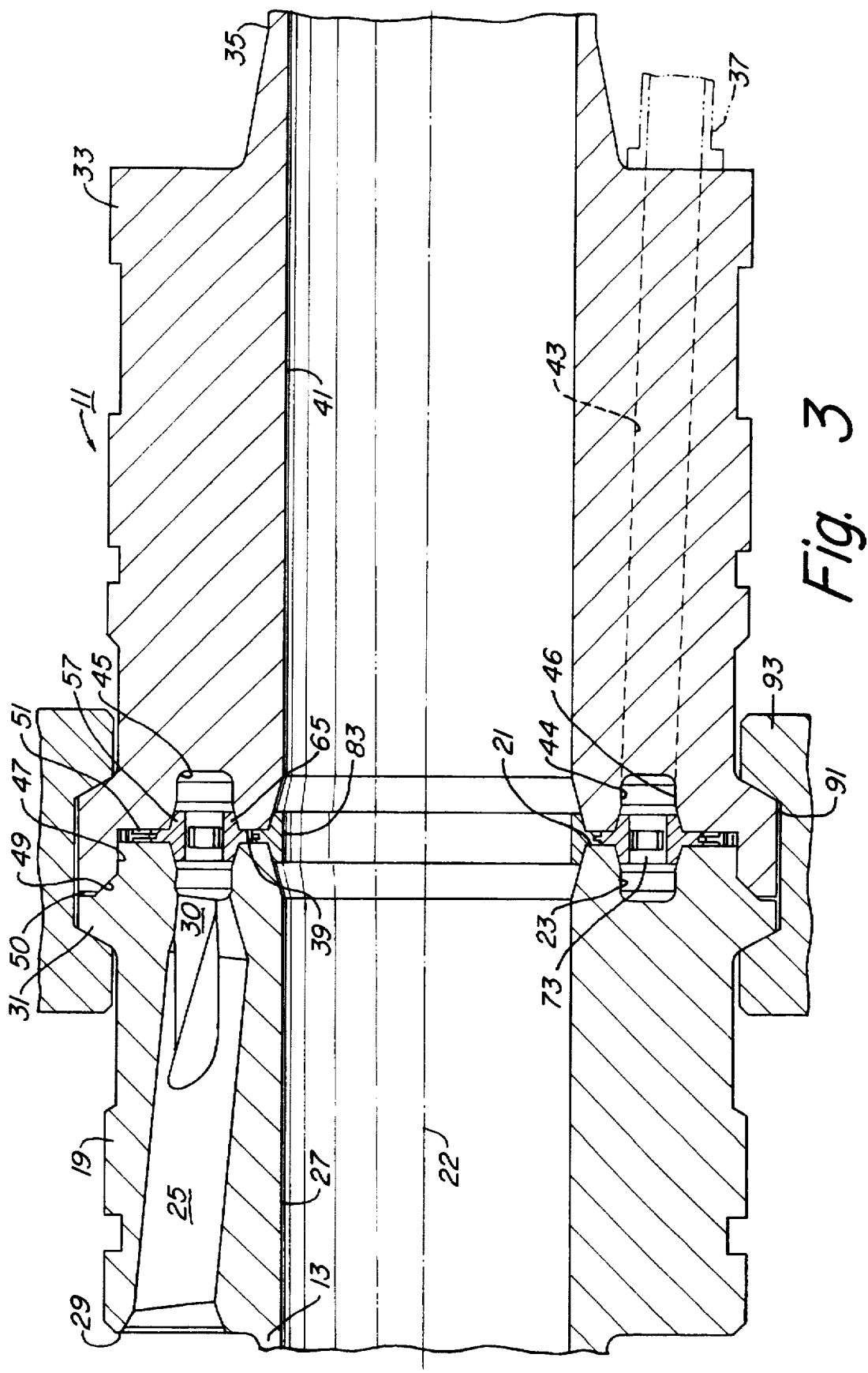

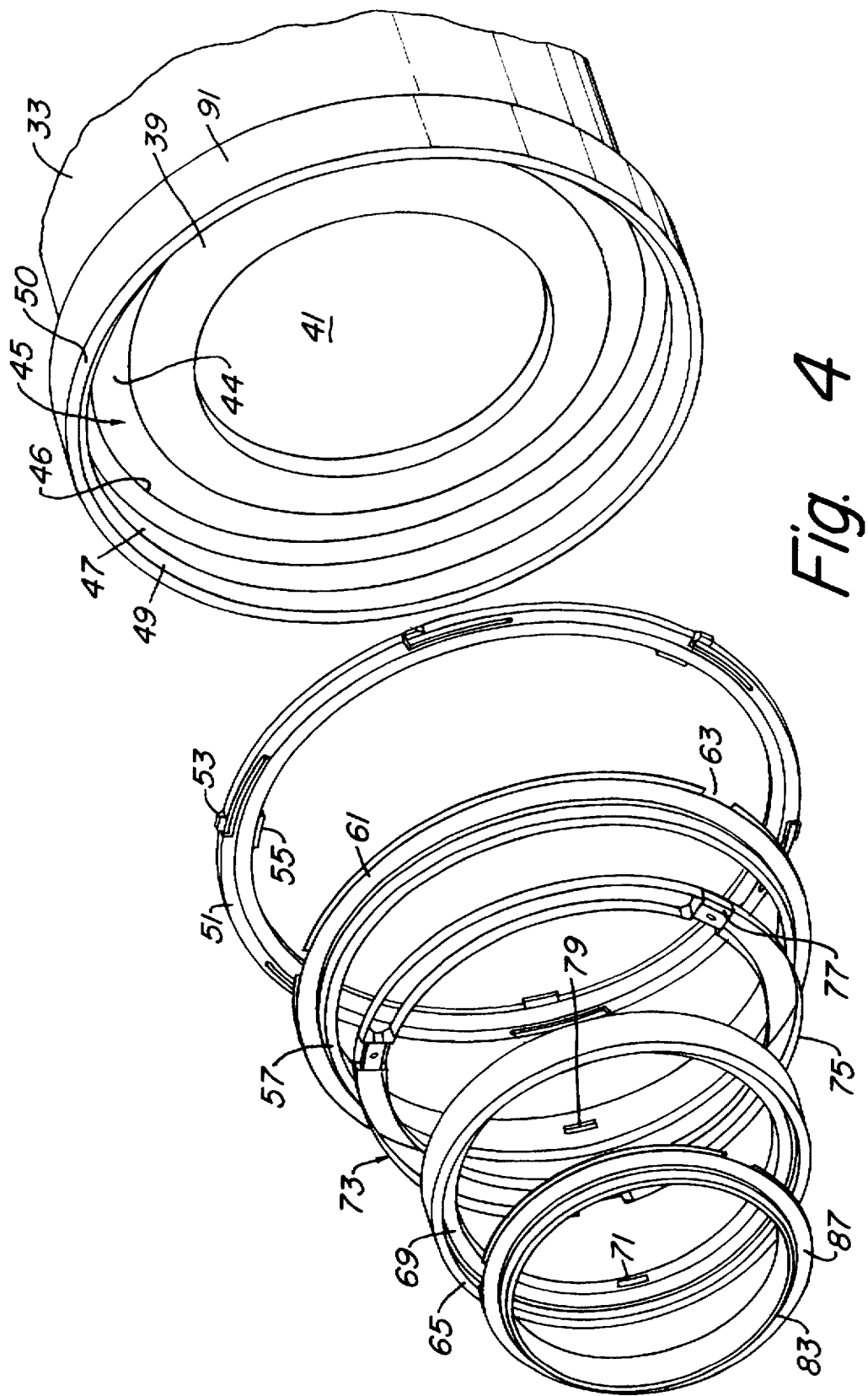

5,794,323

1

NON-ORIENTING MULTIPLE BORE HUB

TECHNICAL FIELD

This invention relates in general to flowline connectors, and in particular to connector hubs for connecting subsea dual flowlines without the need for orientation.

BACKGROUND ART

In offshore oil and gas production, flowlines are located on the sea floor for delivering production fluids from a subsea production tree to a remote processing facility. Flowline pull-in systems are employed to pull sections of the flowlines into engagement with each other and connect them. In deep water, flowlines need to be connected without the use of divers.

One type of connector employed with flowline pull-systems and other marine applications has two mating hubs, each having an external flange. A clamp is mechanically driven radially inward to clamp the hubs together. A metal seal is located between the faces of the hubs for sealing.

This type of mechanical remote connector works well, however in some instances it is desirable to connect two side-by-side flowlines to two other dual flowlines with a single multi-bore connector. One of the flowlines, referred to herein as an auxiliary flowline, will be located alongside of the primary flowline. The primary flowline is normally larger in diameter and often is used for oil flow. The smaller diameter auxiliary line may be used for gas flow. With current technology, multi-bore connections are difficult to make because of the requirement of having to orient the auxiliary flowlines in axial alignment with each other. Moreover, a multi-bore connection requires multiple seals which are difficult to handle in diverless operations. Previous proposals required very sensitive rotational alignment, subjecting the multi-bore to initial joint leakage.

DISCLOSURE OF INVENTION

The subsea flowline assembly of this invention utilizes mating hub members for connecting dual flowlines together in a multi-bore connection. Each hub member has an axial bore connected to the primary pipe or flowline. Also, each hub has an auxiliary passage offset from the primary bore which extends from the face of each hub and is connected to the auxiliary pipe. At least one of the faces of the hub members has an annular concentric recess or groove which defines an annular flow channel when the faces are mated to each other. The first ends of the auxiliary passage are located in the flow channel.

The hub members have external flanges. A clamp engages the external flanges to connect the hub members in abutment with each other. The annular flow channel allows communication between the auxiliary passages without the need for orientation.

A unitary seal assembly is inserted by a remote operated vehicle ("ROV") or remote operated tool into engagement with one of the hub members prior to make up. The seal assembly includes a seal retainer, an outer auxiliary seal, an inner auxiliary seal, and a primary seal. A linkage means links three seals together and to the seal retainer. This allows the ROV to initially position all of the seals in place during a single insertion. The inner and outer auxiliary seals seal the annular flow channel. The primary seal seals the primary bore.

2

Figure 1:
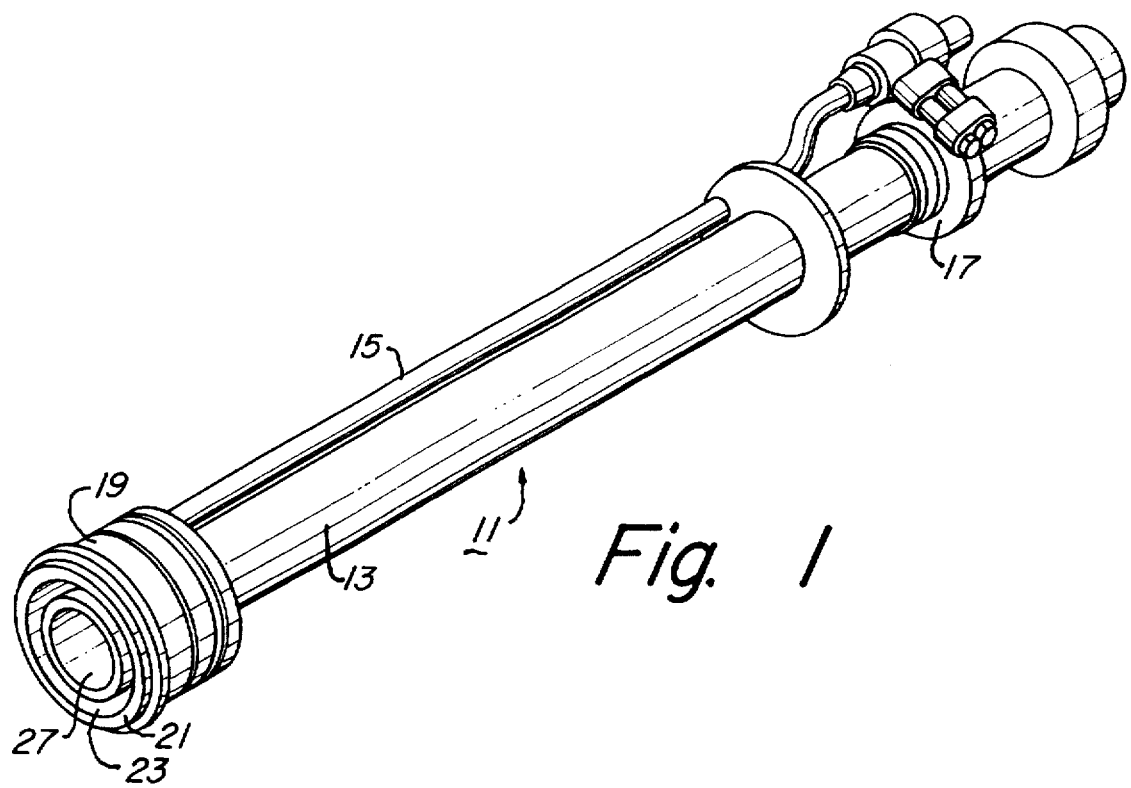
FIG. 1 illustrates a dual flowline having a male hub member constructed in accordance with this invention.
Figure 2:
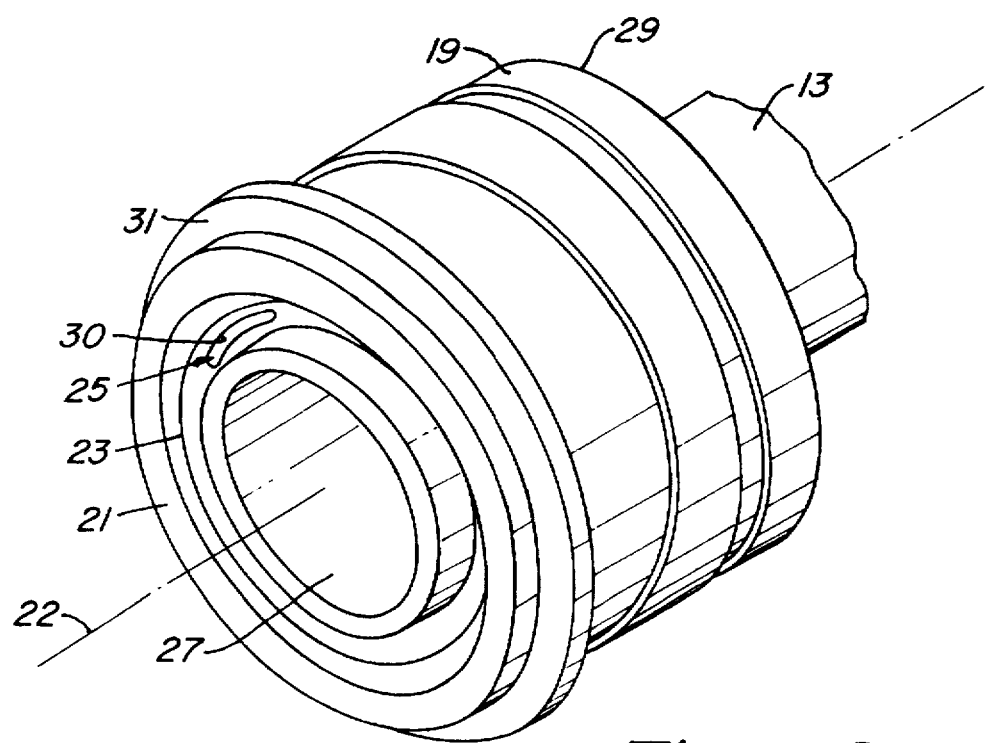

FIG. 2 is an enlarged perspective view of the male hub connector of FIG. 1.

FIG. 3 is a vertical sectional view illustrating the male hub member of FIG. 1 connected to a female hub member constructed in accordance with this invention.

FIG. 4 is an exploded perspective view illustrating a seal assembly which is inserted into the female hub member of FIG. 3.

Figure 5:
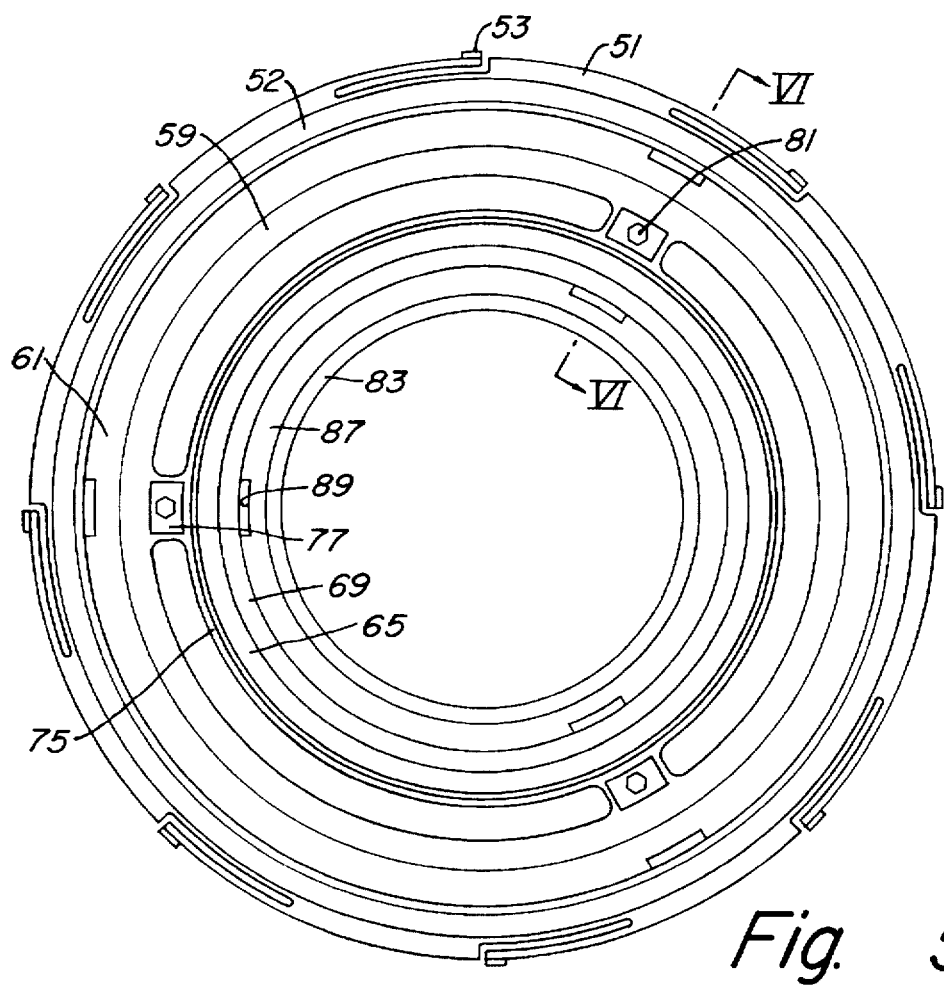

FIG. 5 is a front elevational view of the seal assembly of FIG. 4.

Figure 6:
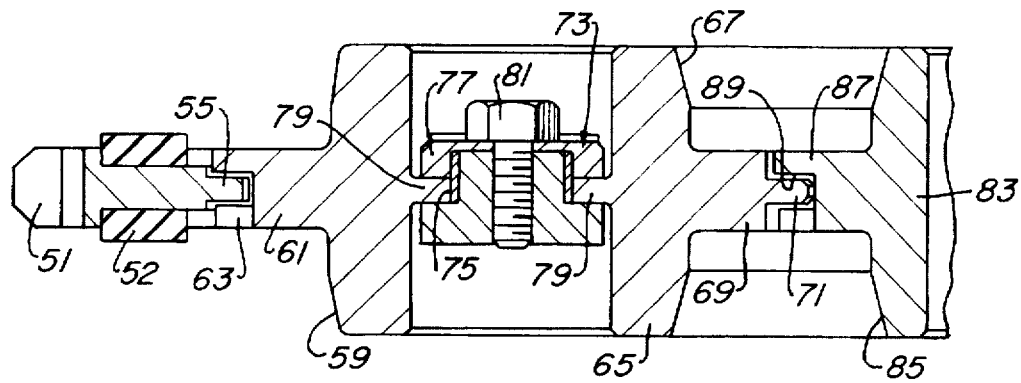

FIG. 6 is a sectional view of the seal assembly of FIG. 4, taken along the line of VI—VI of FIG. 5.

BEST MODE FOR CARRYING OUT THE INVENTION

Referring to FIG. 1, a section of a dual subsea flowline 11 is shown. Flowline 11 may be laid on the sea floor for connecting a subsea oil and/gas production tree to a remote processing facility. Flowline 11 has a primary pipe 13 which typically would be used for the transmission of liquids such as oil and water. An auxiliary pipe 15 extends alongside of primary pipe 13, and typically may be used for the delivery of gas. Auxiliary pipe 15 is secured generally parallel to primary pipe 13 by a clamp 17. In the embodiment shown, primary pipe 13 is considerably larger in diameter than auxiliary pipe 15.

A first hub member 19 is located on the end of the section of flowline 11. First hub member 19, shown in FIG. 2, has a face 21 that is perpendicular to the longitudinal axis 22 of hub member 19 and flowline 11. An annular concentric groove or recess 23 is formed in face 21. An auxiliary passage 25 extends through hub member 19, having a first end terminating in groove 23. A primary bore 27 extends along axis 22 through hub member 19 and has a first end terminating at face 21. Hub member 19 is larger in diameter than primary pipe 13, and has an external shoulder 29 that joins and extends radially outward from the junction with primary pipe 13. Shoulder 29 faces opposite to face 21. As shown also in FIG. 3, auxiliary passage 25 has a second end at shoulder 29 where auxiliary pipe 15 (FIG. 1) will be secured by a coupling.

Auxiliary passage 25 is cylindrical for most of its length, but has an oval flared portion 30 at its first end. The diameter of the cylindrical portion of auxiliary passage 25 is greater than the transverse width of groove 23 and substantially equal to the internal diameter of auxiliary pipe 15. The flared portion 30 is dimensioned so as to provide a substantially constant flow area throughout its length that is substantially equal to the flow area in the cylindrical portion of auxiliary passage 25. Hub member 19 has an external flange 31 which has a tapered shoulder.

First hub member 19 mates with a second hub member 33 in abutting engagement. Hub member 33 is connected to another section of primary pipe 35 and another section of auxiliary pipe 37. Hub member 33 has a face 39 that is perpendicular to its longitudinal axis, which will also be referred to as axis 22 because the axes coincide when the hub members 19, 33 are made up. A primary bore 41 extends through hub member 33 and joins primary pipe 35.

An auxiliary passage 43 extends from face 39 to a connection with auxiliary pipe 37. Auxiliary passage 43 is configured the same as auxiliary passage 25 in first hub member 19, also having a flared end. Auxiliary passage 43 joins a concentric groove 45 formed in face 39. Grooves 23, 45 register with each other to define an annular flow channel when made up as shown in FIG. 3. The cross-sectional flow area of the flow channel is preferably substantially equal to the flow areas of the each of the auxiliary passages 25, 33 so as to avoid significant pressure changes of the flowing fluid. Each of the grooves 23, 45 has an inner sidewall 44 and an outer sidewall 46 relative to axis 22 which are tapered at their intersections with the faces 21, 39.

In the embodiment shown, second hub member 33 has an internal inward facing fine alignment wall 47 that is at a small tapered angle relative to axis 22. An internal inward facing gross alignment wall 49 joins fine alignment wall 47 and extends to a circular rim 50. Rim 50 is parallel to face 39 and spaced axially from it. First hub member 19 has an external fine alignment surface and a gross alignment surface that slide into engagement with walls 47, 49.

Referring to FIG. 4, before hub members 19, 33 are connected, a seal assembly will be installed in second hub member 33 by an ROV. The seal assembly includes a seal retainer 51 which has an outer diameter containing a plurality of fingers 53. Cuts formed in the body of seal retainer 51 provide radial resiliency to fingers 53. Fingers 53 are adapted to frictionally engage the base of fine alignment wall 47, which serves as a retainer wall to retain seal retainer 51 with hub member 33. Seal retainer 51 has an inner periphery with a plurality of lugs 55 protruding radially inward. Referring to FIG. 6, in the embodiment shown, two elastomeric wiper seals 52 are located on opposite sides of seal retainer 51. The outer edges of wiper seals 52 are bonded to seal retainer 51 while the inner portion of each seal 52 is free to be deformed radially inward during make-up to wipe portions of the faces 21, 39 (FIG. 3) free of debris.

An outer auxiliary seal 57 is carried within seal retainer 51 by lugs 55. Outer auxiliary seal 57 has outer seal surfaces 59, shown in FIG. 6, for engaging the outer sidewalls 46 of grooves 23, 45 (FIG. 3). Outer auxiliary seal 57 is a metal, T-shaped member having a rib 61 extending radially outward from the junction of its outer seal surfaces 59. A plurality of slots 63 are formed in the periphery of rib 61 to receive lugs 55. Inserting outer auxiliary seal 57 into seal retainer 51, then rotating a short distance, causes lugs 55 to lock within slots 63.

An inner auxiliary seal 65 is carried by outer auxiliary seal 57. Inner auxiliary seal 65 has inner seal surfaces 67 for engaging the inner sidewalls 44 of grooves 23, 45 (FIG. 3). Inner auxiliary seal 65 has a rib 69 which protrudes radially inward from the junction of its seal surfaces 67. Rib 69 has a plurality of lugs 71 on its inner periphery.

An intermediate connector 73 connects inner auxiliary seal 65 to outer auxiliary seal 57. Intermediate connector 73, as shown in FIG. 4, comprises two thin, circular concentric bands 75. Bands 75 are secured together by three brackets 77 spaced 120 degrees apart from each other. Brackets 77 engage tabs 79 formed on the inner diameter of outer auxiliary seal 57 and outer diameter of inner auxiliary seal 65. A fastener 81 secures brackets 77 to tabs 79 to secure inner auxiliary seal 65 to outer auxiliary seal 57. The spaces between bands 75 allow unobstructed fluid flow through the flow channel provided by grooves 23, 45.

Referring again to FIG. 4, a primary seal 83 is carried by inner auxiliary seal 65. Primary seal 83 has two outer seal surfaces 85 for sealing tapered sections at the first ends of primary bores 27, 41 (FIG. 3). A rib 87 extends radially outward from the junction of seal surfaces 85. Rib 87 has plurality of slots 89. Slots 89 receive lugs 71 of inner auxiliary seal 65. Inserting lugs 71 into slots 89 and rotating primary seal 83 a short distance secures primary seal 83 to inner auxiliary seal 65. The various lugs and slots and intermediate connector serve as a linkage means for securing the seals 57, 65, 83 together and to seal retainer 51 in an assembly. There are sufficient clearances between lugs 55, 71, 79 and their respective slots and flexiblity in connector 73 to allow the seals 57, 65, 83 to seal independently of each other. The sealing engagement of one of the seals 57, 65, 83 will not affect the others.

Referring to FIG. 3 again, second hub member 33 has an external flange 91. Flanges 31, 91 have opposed tapered shoulders. A segmented clamp 93 is employed to clamp the hub members 19, 33 together with their axis 22 coinciding.

In operation, second hub member 33 will be supported at the sea floor by the frame (not shown) of clamp 93. At the surface, auxiliary seals 57, 65 will be connected together by intermediate connector 73. Primary seal 83 will be connected to inner auxiliary seal 65 by lugs 71. Outer auxiliary seal 57 will be connected to seal retainer 51 by lugs 55. The entire unitary assembly, as shown in FIG. 5, will then be mounted to an ROV and lowered into the sea. The ROV will insert the seal assembly into the receptacle of second hub member 33. When inserted, fingers 53 engage fine alignment wall 47 to cause seal retainer 51 to grip second hub member 33. This positions inner and outer auxiliary seals 65, 57 in an initial position partially within groove 45. It also positions primary seal 83 in an initial position partially within primary bore 41.

The pull-in equipment will then pull first hub member 19 into engagement with second hub member 33. There is no need to orient auxiliary passage 25 with auxiliary passage 43. Axial alignment surfaces 47, 49 will axially align first hub member 19 with second hub member 33 before its face 21 contacts any of the seals 83, 65 or 57. Once in alignment, with their axis 22 coinciding, clamp 93 is radially contracted. Clamp 93 engages flanges 91 to force the hub members 19, 33 tightly together. Faces 21, 39 will force seals 57, 65, and 83 into full sealing engagement and then abut ribs 61, 69 and 87. Wiper seals 52 (FIG. 6) will be clamped between faces 21, 39, and during deformation, will wipe a portion of the faces 21, 39.

After testing, flowline 11 will be subsequently put into use. Fluid will flow through primary pipe 13 to primary pipe 35 by flowing through primary bores 27, 41. Fluid will flow through auxiliary pipes 15, 37 by flowing through auxiliary passages 25, 43. Auxiliary passages 25, 43 need not be aligned because the fluid will flow into the flow channel defined by grooves 23, 45, from one auxiliary passage 25 to the other auxiliary passage 43. Because the flow areas of flared sections 30 and the flow channel defined by grooves 23, 45 are substantially the same as the flow areas in the auxiliary pipes 15, 37, the fluid should not encounter significant pressure changes.

The invention has significant advantages. Connecting two flowlines with a single multi-bore connector decreases the cost for the connection site since only one connector is required. Installation costs are also reduced because only one pull-in is required for two connections. Having only a single connector could reduce the overall template or tree size, reducing capital equipment costs. The concentric flow channel eliminates the need for orienting the two auxiliary pipes. The seals do not require any particular orientation. The unitary seal assembly allows installation of all of the seals in a single insertion with an ROV.

While the invention has been shown in only one of its forms, it should be apparent to those skilled in the art that it is not so limited, but is susceptible to various changes without departing from the scope of the invention.

I claim:

1. In a subsea flowline having a primary pipe and an auxiliary pipe carried alongside the primary pipe, a connector for connecting sections of the primary pipe and auxiliary pipe together, comprising in combination:

first and second hub members, each hub member having a longitudinal axis and an axial bore joined to one of the sections of the primary pipe, a concentric mateable face surrounding the bore, and an auxiliary passage having a first end at the face and a second end joined to one of the sections of the auxiliary pipe;

at least one of the faces having an annular concentric groove formed therein, defining an annular flow channel when the faces are mated to each other, the first ends of the auxiliary passages being in communication with the flow channel;

an external shoulder on each of the hub members; and a clamp which engages the external shoulders to connect the hub members together with their axes coinciding, the annular flow channel allowing communication between the auxiliary passages even if misaligned with each other.

2. The flowline according to claim 1 wherein the first end of each of the auxiliary passages is flared.

3. The flowline according to claim 1, further comprising:

an outer auxiliary seal for sealing an outer side of the annular flow channel;

an inner auxiliary seal for sealing an inner side of the annular flow channel; and a primary seal for sealing the primary bore.

4. The flowline according to claim 1, further comprising:

an outer auxiliary seal which engages an outer margin of the groove for sealing an outer side of the annular flow channel;

an inner auxiliary seal which engages an inner margin of the groove for sealing an inner side of the annular flow channel;

a primary seal which engages a margin of the primary bore for sealing the primary bore;

a seal retainer located radially outward of the outer auxiliary seal; and linkage means for attaching the seal retainer to the outer and inner auxiliary seals and to the primary seal to enable the seal retainer, outer and inner auxiliary seals and the primary seal to be carried subsea and installed on one of the hub members as an assembly.

5. The flowline according to claim 1 wherein:

the second hub member has an inward facing retainer wall at its periphery;

the groove is located in the face of the second member; and wherein the flowline further comprises:

an outer auxiliary seal which engages the face of the second hub member at an outer side wall of the groove for sealing an outer side of the annular flow channel;

an inner auxiliary seal which engages the face of the second hub member at an inner side wall of the groove for sealing an inner side of the annular flow channel;

a primary seal which engages the face of the second hub member at the primary bore for sealing the primary bore; and a seal retainer located radially outward of the outer auxiliary seal and having means for releasably engaging the retainer wall; and linkage means for attaching the seal retainer to the outer and inner auxiliary seals and to the primary seal to enable the seal retainer, outer and inner auxiliary seals and the primary seal to be carried subsea and installed on the second hub member as an assembly, the linkage means having sufficient flexibility to allow each of the outer and inner auxiliary seals and the prinmary seal to seal independently.

6. In a subsea flowline having a primary pipe and an auxiliary pipe carried alongside the primary pipe, a connector for connecting sections of the primary pipe and auxiliary pipe together, comprising in combination:

first and second hub members, each hub member having a longitudinal axis and an axial bore joined to one of the sections of the primary pipe, a concentric face surrounding the bore, and an auxiliary passage having a first end at the face and a second end joined to one of the sections of the auxiliary pipe;

an annular concentric groove formed in the face of the second hub member, having inner and outer side walls, the first end of the auxiliary passage in the second hub member being in communication with the groove, the first end of the auxiliary passage in the first hub member being spaced radially the same distance from the axis of the first hub member as the first end of the auxiliary passage of the second hub member from the axis of the second hub member;

an inward facing retainer wall at an outer periphery of the second hub member;

an outer auxiliary seal which engages the face of the second hub member at the outer side wall of the groove;

an inner auxiliary seal which engages the face of the second hub member at the inner side wall of the groove;

a primary seal which engages the face of the second hub member at the primary bore for sealing the primary bore;

an annular seal retainer located radially outward of the outer auxiliary seal and having means for releasably engaging the retainer wall; and linkage means for attaching the seal retainer to the outer and inner auxiliary seals and to the primary seal to enable the seal retainer, outer and inner auxiliary seals and the primary seal to be carried subsea and installed on the second hub member as an assembly.

7. The flowline according to claim 6 wherein the first end of each of the auxiliary passages is flared.

8. The flowline according to claim 6, wherein the linkage means comprises:

an outer connector which releasably joins the seal retainer to the outer auxiliary seal;

an intermediate connector which releasably joins the inner and outer auxiliary seals together; and an inner connector which releasably joins the inner auxiliary seal to the primary seal.

9. The flowline according to claim 6, wherein:

the seal retainer has an inner periphery that closely receives an outer periphery of the outer auxiliary seal;

the inner auxiliary seal has an inner periphery that closely receives an outer periphery of the primary seal; and the linkage means comprises:

means on the peripheries of the seal retainer and outer auxiliary seal for connecting the seal retainer to the outer auxiliary seal;

means on the peripheries of the inner auxiliary seal and the primary seal for connecting the inner auxiliary seal to the primary seal; and an intermediate connector which releasably joins the inner and outer auxiliary seals together.

10. The flowline according to claim 6, further comprising an annular groove in the face of the first hub member which registers with the groove in the face of the second hub member to define an annular flow channel for fluid flowing through the auxiliary pipe.

11. In a subsea flowline having a primary pipe and an auxiliary pipe carried alongside the primary pipe, a connector for connecting sections of the primary pipe and auxiliary pipe together, comprising in combination:

first and second hub members, each hub member having a longitudinal axis and an axial bore joined to one of the sections of the primary pipe, a concentric face surrounding the bore, and an offset passage having a first end at the face and a second end joined to one of the sections of the auxiliary pipe;

an annular concentric groove formed in the face of each of the hub members, the grooves mating with each other to form an annular flow channel, each of the grooves having inner and outer tapered side walls, the first end of each of the auxiliary passages being in communication with the groove;

a metal outer auxiliary seal which has outer seal surfaces which engage the outer side walls of the grooves;

a metal inner auxiliary seal which has inner seal surfaces which engages the inner side walls of the grooves;

a metal primary seal which has outer seal surfaces which engage the primary bores;

an external shoulder on each of the hub members; and a clamp which engages the external shoulders to connect the hub members together with their axes coinciding, the annular flow channel allowing communication between the auxiliary passages even if misaligned with each other.

12. The flowline according to claim 11 wherein each of the seals has a radially extending rib which locates between abutting portions of the faces.

13. The flowline according to claim 11, further comprising:

a seal retainer carried by at least one of the hub members radially outward of the outer auxiliary seal; and linkage means for attaching the seal retainer to the outer and inner auxiliary seals and to the primary seal to enable the seal retainer, outer and inner auxiliary seals and the primary seal to be carried subsea and installed on one of the hub members as an assembly prior to make up of the hub members, the linkage means having sufficient flexibility to allow each of the outer and inner auxiliary seals and the primary seal to seal independently of each other.

14. The flowline according to claim 11 wherein:

the second hub member has an inward facing retainer wall at its periphery; and wherein the flowline further comprises:

an annular seal retainer located radially outward of the outer auxiliary seal and having means for releasably engaging the retainer wall; and linkage means for attaching the seal retainer to the outer and inner auxiliary seals and to the primary seal to enable the seal retainer, outer and inner auxiliary seals and the primary seal to be carried subsea and installed on the second hub member as an assembly prior to make up with the first hub member.

15. The flowline according to claim 11 wherein:

the second hub member has an inward facing retainer wall at its periphery; and wherein the flowline further comprises:

an annular seal retainer located radially outward of the outer auxiliary seal and having means for releasably engaging the retainer wall;

an outer connector which releasably joins the seal retainer to the outer auxiliary seal;

an intermediate connector which releasably joins the inner and outer auxiliary seals together; and an inner connector which releasably joins the inner auxiliary seal to the primary seal.

16. The flowline according to claim 11 wherein the second hub member has an inward facing retainer wall at its periphery; and wherein the flowline further comprises:

an annular seal retainer located radially outward of the outer auxiliary seal and having means for frictionally engaging the retainer wall;

the seal retainer having an inner periphery that closely receives an outer periphery of the outer auxiliary seal;

the inner auxiliary seal having an inner periphery that closely receives an outer periphery of the primary seal;

means on the peripheries of the seal retainer and outer auxiliary seal for connecting the seal retainer to the outer auxiliary seal;

means on the peripheries of the inner auxiliary seal and the primary seal for connecting the inner auxiliary seal to the primary seal; and an intermediate connector which releasably joins the inner and outer auxiliary seals together.

17. A method of connecting two sections of a subsea flowline together, each of the sections having a primary pipe and an auxiliary pipe carried alongside the primary pipe, the method comprising:

attaching a first hub member to one of the sections and a second hub member to the other of the sections, each hub member having a longitudinal axis and an axial bore joined to one of the sections of the primary pipe, a concentric face surrounding the bore, and an auxiliary passage having a first end at the face and a second end joined to one of the sections of the auxiliary pipe, at least one of the faces having an annular concentric groove formed therein, the first end of one of the auxiliary passages registering with the groove; and without orienting the first ends of the auxiliary passages with each other, clamping the hub members together with their axes coinciding, the groove allowing communication between the auxiliary passages.

18. The method according to claim 17, further comprising:

sealing an outer side of the groove with an outer auxiliary seal;

sealing an inner side of the groove with an inner auxiliary seal; and sealing the primary bore with a primary seal.

19. The method according to claim 17, further comprising:

providing a seal retainer and linking the seal retainer to an outer auxiliary seal, an inner auxiliary seal, and a primary seal to provide an assembly;

before clamping the hub members together, securing the assembly to the hub member which contains the groove with the seal retainer in a position which places the inner auxiliary seal and outer auxiliary seals in registry with the groove and the primary seal in registry with the primary bore; then clamping the hub members together.

* * * * *